United States Patent [19]

Miles et al.

[11] 4,416,958

[45] Nov. 22, 1983

[54] THERMAL BATTERY CELLS UTILIZING AGNO$_3$ IN LIC$_1$O$_4$-LINO$_3$ MIXTURES

[75] Inventors: Melvin H. Miles; Aaron N. Fletcher, both of Ridgecrest, Calif.

[73] Assignee: The United States of America as represented by the Secretary of the Navy, Washington, D.C.

[21] Appl. No.: 383,862

[22] Filed: Jun. 1, 1982

[51] Int. Cl.$^3$ .................. H01M 6/20; H01M 6/36
[52] U.S. Cl. .................................. 429/103; 429/112
[58] Field of Search ................. 429/102, 103, 112

[56] References Cited

U.S. PATENT DOCUMENTS

| | | | |
|---|---|---|---|
| 3,977,900 | 8/1976 | Luehrs | 138/83 T |
| 4,190,704 | 2/1980 | Miles et al. | 429/103 |
| 4,234,667 | 11/1980 | Bennion et al. | 429/112 |
| 4,260,667 | 4/1981 | Miles et al. | 429/112 |

*Primary Examiner*—Donald L. Walton
*Attorney, Agent, or Firm*—Robert F. Beers; W. Thom Skeer; Bruce H. Cottrell

[57] ABSTRACT

A thermally activated electrochemical cell is provided having a low melting point electrolyte. The electrolyte is composed of a layer of a mixture of lithium perchlorate and lithium nitrate adjacent the anode and of a layer of a mixture of lithium perchlorate, lithium nitrate, and silver nitrate adjacent the cathode of the cell.

8 Claims, No Drawings

THERMAL BATTERY CELLS UTILIZING AGNO3 IN LICLO4-LINO3 MIXTURES

BACKGROUND OF THE INVENTION

1. Field of the Invention

This invention relates to the field of electrochemistry. This invention more particularly relates to thermally activated electrochemical cells and still more particularly to thermally activated electrochemical cells including a novel electrolyte system.

2. Description of the Prior Art

Thermally activated electrochemical cells or batteries have been used quite extensively in military applications, such as a power source for arming devices, because of their long shelf life and compactness, and capability of withstanding shock and vibration. Batteries of this type typically include an electrolyte which, under normal storage conditions, is solid and does not conduct electricity. When the battery and/or the electrolyte is heated to a predetermined temperature, as by a built-in pyrotechnic heat source, the electrolyte, upon changing to a molten state, becomes electrically conductive and ionically connects the electrodes to provide the desired electromotive force.

Most of the thermal batteries presently employed in missile systems make use of a lithium chloride-potassium chloride (LiCl-KCl) mixture as the electrolyte, calcium metal as the anode and calcium chromate (CaCrO$_4$) as the cathodic material. The relatively high melting point of the electrolyte limits the activation of the battery to temperatures above 352° C., and thermal batteries using LiCl-KCl mixtures are generally designed to operate at internal temperatures of between 475° and 550° C.

Nitrate salts have been proposed for use in thermal batteries because of their low melting points. See U.S. Pat. No. 4,260,667 to the applicants and hereby incorporated by reference. For example, potassium nitrate-lithium nitrate (KNO$_3$-LiNO$_3$) mixtures melt at temperatures as low as 132° C. The use of a lower melting electrolyte can shorten a battery's activation time and reduce the weight of heat sources and insulation. Another major advantage is that the molten nitrate can also function as the oxidizer thus simplifying battery construction by eliminating the necessity for the addition of a separate oxidizer such as CaCrO$_4$. Furthermore, nitrate salts are low-hazard materials, unlike chromates, which are recognized as health hazards (CaCrO$_4$ has been confirmed as a carcinogen). The high rate discharge of prior nitrate salt-containing battery cells, however, have been limited by both the anode and the cathode.

SUMMARY OF THE INVENTION

The principal object of this invention is to provide a nitrate salt-containing thermally activated battery cell capable of sustaining high current densities.

Other objects, advantages, and aspects of the invention will become apparent upon reviewing the following detailed description and the appended claims.

The thermally activated electrochemical cell according to the invention provides for a nitrate salt-containing cell capable of sustaining high current densities of 100 milliampere per square centimeter at 350° C. to give cell voltages in excess of two volts for several minutes, thus overcoming the cathode high rate discharge limitations of the prior art cell. This is accomplished through the addition of silver nitrate (AgNO$_3$) to the nitrate salt electrolyte in the vicinity of the cathode. Also, at lower rates of discharge such as ten milliamperes per square centimeter, the inventive cells give very stable potentials for times periods exceeding sixty minutes.

DESCRIPTION OF THE PREFERRED EMBODIMENT

Previously known nitrate salt-containing thermal battery cells such as, for example, those having a LiNO$_3$-LiCl-KCl(50-25-25 mole percent) electrolyte in a calcium anode and nickel cathode cell have displayed acceptable stability at low rate discharge conditions. Such a cell can be activated at 160° C., operated over a temperature range of 250°–450° C. to produce 2.5–2.8 volts at open circuit and initial operating voltages above 2 volts at ten milliampere per square centimeters. At operating temperatures between 250° and 350° C. this batter cell shows promise for applications requiring a sixty-minute thermal battery. At current densities above 20–30 milliamperes per square centimeter, cell performance deteriorates due to polarization at the anode. See U.S. Pat. No. 4,260,667 to Miles et al.

The present invention overcomes the high rate discharge limitations of the prior art nitrate cell. The rate of the calcium anode reaction in molten nitrates is believed to be largely determined by the passivating calcium oxide film that forms upon the anode surface, hindering passage of calcium ions into the molten electrolyte. It has been found that the presence of LiClO$_4$ improves the performance of the anode during high rate discharge. Tests indicated that the calcium anode, where oxidation occurs, can sustain current densities as great as 100 milliamperes per square centimeter when a LiClO$_4$-LiNO$_3$ mixture is employed as an electrolyte. Also, the chemistry of the cell with addition of perchlorate ion gives a higher theoretical potential than nitrate alone, i.e., 3.2 volts vs. 2.8 volts, respectively.

It was found, however, that when operating the above cell under high current densities the cathode, where reduction occurs, showed considerable polarization and thus limited the cell performance. It was then found that the addition of AgNO$_3$ to the electrolyte greatly improves the performance of the cathode. The reduction reaction on nickel readily sustains 100 milliamperes per square centimeter with very little polarization in the presence of AgNO$_3$. The preformance of the calcium anode, however, is poor when placed in direct contact with this mixture. This problem was solved by the addition of the AgNO$_3$ to the electrolyte only in the vicinity of the cathode. Although the inventors should not be held to any particular theory, it is suggested that the polarization of the cathode in the absence of AgNO$_3$ is likely due to blocking of the electrode surface by insoluble lithium oxide produced by the reduction of lithium perchlorate or lithium nitrate, which inhibits further reaction at the cathode. The addition of the silver nitrate prevents this blockage by a mechanism not presently fully understood.

A preferred embodiment of the invention provides a thermal battery cell with a calcium anode, a nickel cathode, a layer of LiClO$_4$-LiNO$_3$ (50-50 mole percent) electrolyte adjacent the anode and a layer of LiClO$_4$-LiNO$_3$-AgNO$_3$ (40-40-20 mole percent) electrolyte adjacent the cathode. The electrolytes are preferably provided as discs such as of fibreglass filter paper with the electrolyte adsorbed thereon, prepared by dipping the disc into the molten electrolyte, removing, and allowing the electrolyte to solidify. The treated fibreglass discs are then placed with their flat surfaces adjacent each other and sandwiched between the anode and cathode to form the cell as described above.

Operation of the above described cell can be carried out within a temperature range of 200° to 375° C. with a preferred range of 250° to 350° C. The most desirable temperature for cell operation is about 300° C.

Metals other than nickel, such as iron, may be employed as suitable cathode materials, however nickel is preferred.

Other silver salts may be suitable in the practice of the invention, but the low melting point of $AgNO_3$ makes it especially attractive. Chlorates such as $NaClO_3$ may be employed in the practice of the invention, but the perchlorate is preferred due to its greater stability towards decomposition.

Operation of the invention is further illustrated by the following examples:

EXAMPLE 1

In a test the above described cell was discharged at 100 milliamperes per square centimeter. In this cell test at 350° C., the cell voltage remained above two volts for seven minutes, and the lifetime to seventy five percent of the peak voltage was nine minutes. The eventual voltage drop of this cell was due to polarization of the anode rather than the cathode. It was shown that the potential of the cathode remains quite steady at about −0.4 volts throughout the cell discharge. Based upon the weights of the calcium, electrolyte, and fibreglass, the energy of the calcium, electrolyte, and fibreglass, the energy density for this cell was 120 watt-hours per kilogram while the power density was 740 watts per kilogram. From the weight of calcium consumed, the current efficiency for the anode was fifteen percent in this test.

EXAMPLE 2

The above described cell was also tested for low rate discharge characteristics and was found to give very stable potentials for long time periods. In a test of such a cell at 350° C. and a discharge rate of ten milliamperes per square centimeter, the cell potential remained above 2.5 volts for over seventy minutes and above 2.0 volts for slightly over two hours. In another test at 350° C. on a cell of this type, discharge at ten milliamperes per square centimeter gave a cell voltage that remained above 2.4 volts for ninety minutes.

Despite the anode polarization that eventually occurs at 100 milliamperes per square centimeter, the test cell is still capable of further discharge and good performance at smaller current densities. For example, in the experiment of Example 2, the cell was discharged at 100 and again at 50 milliamperes per square centimeter, respectively, until potentials fell below one volt prior to conducting the experiment at 10 milliamperes per square centimeter. The total energy density for this study was about 240 watt-hours per kilogram.

For a detailed description of the experimental apparatus and procedures see U.S. Pat. No. 4,260,667 as referred to above.

In summary, a novel thermal activated electrochemical cell and a battery incorporating this cell have been developed employing nitrate electrolyte capable of operating under high rate discharge conditions. The presence of $LiClO_4$ improves the performance of the anode and employment of $AgNO_3$ in the $LiClO_4$-$LiNO_3$ electrolyte mixture in the vicinity of the cathode allows effective high rate discharge cell performance.

Obviously many modifications and variations of the present invention are possible in light of the above teachings. It is therefore to be understood that within the scope of the appended claims the invention may be practiced other than as specifically described.

We claim:

1. A thermally activated electrochemical cell including:
   a cathode composed of metallic nickel, where reduction occurs,
   an anode composed of metallic calcium, where oxidation occurs, and
   an electrolyte which is disposed between said cathode and said anode, is an electrically non-conductive solid at ambient temperatures, and is capable of becoming an ionically conductive liquid upon being heated above its melting point, said electrolyte comprising an electrolyte layer comprising a mixture of $LiClO_4$ and $LiNO_3$ adjacent to said anode, and an electrolyte layer comprising a mixture of $LiClO_4$, $LiNO_3$, and $AgNO_3$ adjacent said cathode and acting as the oxidizer.

2. A cell according to claim 1 wherein said $LiClO_4$-$LiNO_3$ electrolyte is disposed in a fibreglass paper element.

3. A cell according to claim 1 wherein said $LiClO_4$-$LiNO_3$-$AgNO_3$ layer is disposed in a fibreglass paper element.

4. A cell according to claim 1 wherein said electrolyte layer adjacent said anode comprises 50 mole percent $LiClO_4$ and 50 mole percent $LiNO_3$.

5. A cell according to claim 1 wherein said electrolyte layer adjacent said cathode comprises 40 mole percent $LiClO_4$, 40 mole percent $LiNO_3$, and 20 mole percent $AgNO_3$.

6. A composed of metallic calcium cathode for use in a thermally activated electrochemical cell, said cathode having an electrolyte layer comprising $LiClO_4$, $LiNO_3$, and $AgNO_3$ immediately adjacent a surface of said cathode.

7. A cathode according to claim 6 wherein said electrolyte layer is disposed in a fibreglass paper element.

8. A cathode according to claim 6 wherein said electrolyte layer comprises 40 mole percent $LiClO_4$, 40 mole percent $LiNO_3$, and 20 mole percent $AgNO_3$.

* * * * *

UNITED STATES PATENT AND TRADEMARK OFFICE
CERTIFICATE OF CORRECTION

PATENT NO. : 4,416,958
DATED : November 22, 1983
INVENTOR(S) : Melvin H. Miles et al It is certified that error appears in the above-identified patent and that said Letters Patent is hereby corrected as shown below:

In the title, line 2, "$LIC_1O_4-LINO_3$" should read -- $LiClO_4-LiNO_3$ --.

Column 1, line 2, "$LICLO_4-LINO_3$" should read -- $LiClO_4-LiNO_3$ --.

Signed and Sealed this

Twenty-seventh Day of March 1984

[SEAL]

Attest:

GERALD J. MOSSINGHOFF

Attesting Officer    Commissioner of Patents and Trademarks